(12) United States Patent
Madhi et al.

(10) Patent No.: US 9,416,766 B2
(45) Date of Patent: Aug. 16, 2016

(54) ENERGY-CAPTURING FLOATING BREAKWATER

(71) Applicants: Farshad Madhi, Albany, CA (US);
Ronald W Yeung, Berkeley, CA (US);
Meghan E Sinclair, Arlington, VA (US)

(72) Inventors: Farshad Madhi, Albany, CA (US);
Ronald W Yeung, Berkeley, CA (US);
Meghan E Sinclair, Arlington, VA (US)

( * ) Notice: Subject to any disclaimer, the term of this patent is extended or adjusted under 35 U.S.C. 154(b) by 7 days.

(21) Appl. No.: 14/499,055

(22) Filed: Sep. 26, 2014

(65) Prior Publication Data

US 2015/0091304 A1   Apr. 2, 2015

Related U.S. Application Data

(60) Provisional application No. 61/883,274, filed on Sep. 27, 2013.

(51) Int. Cl.
  *F03B 13/14*   (2006.01)
  *F03B 13/18*   (2006.01)

(52) U.S. Cl.
  CPC ....... *F03B 13/1845* (2013.01); *F05B 2220/707* (2013.01); *F05B 2240/93* (2013.01); *F05B 2240/97* (2013.01); *F05B 2250/41* (2013.01); *Y02E 10/38* (2013.01)

(58) Field of Classification Search
  CPC ...................................... F03B 13/12
  USPC ........................................... 290/53
  See application file for complete search history.

(56) References Cited

U.S. PATENT DOCUMENTS

| | | | | |
|---|---|---|---|---|
| 1,507,461 A * | 9/1924 | Chase | ...................... | F03B 13/22 405/224 |
| 3,151,564 A * | 10/1964 | Rosenberg | ............ | F03B 13/182 60/499 |
| 3,928,967 A * | 12/1975 | Salter | .................. | F03B 13/1815 415/7 |
| 4,123,185 A * | 10/1978 | Hagen | ..................... | E02B 3/062 114/258 |
| 4,552,514 A * | 11/1985 | Hagen | ................. | F03B 13/1815 202/180 |
| 4,691,661 A * | 9/1987 | Deiana | .................... | B63B 35/38 114/266 |
| 5,405,250 A * | 4/1995 | Vowles | ............... | F03B 13/1815 417/331 |
| 8,614,520 B2 * | 12/2013 | Rohrer | .................. | F03B 13/182 290/42 |
| 8,696,246 B2 * | 4/2014 | Polo | ........................ | E02D 27/42 405/207 |
| 2008/0093852 A1 * | 4/2008 | Vowles | ................... | F03B 13/14 209/42 |
| 2010/0140945 A1 * | 6/2010 | Andujar | ................ | F03B 13/182 290/53 |

FOREIGN PATENT DOCUMENTS

| | | | |
|---|---|---|---|
| CN | 202730733 U | * 2/2013 | |
| CN | 104099895 A | * 10/2014 | |
| GB | 1514461 A | * 6/1978 | ............. E02B 3/062 |

OTHER PUBLICATIONS

Mahdi et al., Dec. 15, 2013, The "Berkley Wedge" an assymetrical energy-capturing floaing breakwater.*
CN 202730733 U Abstract.*

* cited by examiner

*Primary Examiner* — Joseph Waks
(74) *Attorney, Agent, or Firm* — Wright Law Group, PLLC; Mark F. Wright

(57) ABSTRACT

An apparatus comprises an asymmetric heaving floating body that resists influence from viscosity effects. The asymmetric heaving floating body is coupled to a Permanent Magnet Linear Generator ("PMLG") that serves as a power take off ("PTO") system. A support structure for the apparatus is designed so as to restrain lateral force and pitching moment. Similarly, the asymmetric floating body is designed to minimize viscosity effects when in motion to transfer incident wave energy to the PTO.

20 Claims, 7 Drawing Sheets

ENERGY-CAPTURING FLOATING BREAKWATER

RELATED APPLICATIONS

This non-provisional patent application claims the benefit of U.S. Provisional Patent Application No. 61/883,274, which application was filed on Sep. 27, 2014 and which application is incorporated herein by reference.

BACKGROUND OF THE INVENTION

1. Technical Field

The present invention relates generally to the field of power generation and more specifically relates to systems and methods for creating energy from naturally occurring events and conditions.

2. Background Art

Ocean waves provide a significant and largely untapped potential energy resource. Research in this area is driven by the need to meet renewable energy targets, but is relatively immature compared to other renewable energy technologies such as solar and wind power. Although solar and wind power have been studied for decades, with increasingly widespread adoption, the field of wave energy conversion is still considered a relatively new area of research and development.

In spite of the relative novelty of the field, the promise of energy from the oceans is significant. For example, the global wave power resource in deep water (e.g., greater than 50 m) is estimated to be about 26,000 TWh/year, which is the same order of magnitude as the electricity consumption for the entire world in 2007. Many scientists now recognize that using waves as a source of renewable energy offers significant advantages over other methods of energy generation including the following:

- sea waves offer the highest energy density among all known renewable energy sources;
- relatively minor negative environmental impact for the to amount of energy produced;
- the natural seasonal variability of wave energy tends to roughly correlate with the electricity demand in temperate climates; and
- waves can travel large distances with little energy loss.

Given the many benefits associated with extracting energy from waves, there have been many previous attempts to create efficient and effective devices to create electrical energy from wave motion. There are many experimental wave-energy devices and much effort has been conducted to increase the efficiency of wave-energy devices. However, there is no large scale use of wave energy convertors ("WEC") currently being used in the world today.

While use of wave energy conversion technology is highly desirable, there remains a number of technical challenges that need to be overcome to increase the performance and the commercial competitiveness of WEC in the global energy market. For example, it is rather difficult to convert the relatively slow (~0.1 Hz), random, and high-force oscillatory motion produced by a series of waves into useful motion to drive a generator with output quality acceptable to the attached utility network. Given that waves vary in height and period, their respective power levels vary accordingly. While gross average power levels can be predicted in advance, this variable input has to be converted into smooth electrical output and, accordingly, usually necessitates some type of energy storage system, or other means of compensation such as an array of devices.

Similarly, in many offshore locations, wave direction is highly variable, and so wave devices generally need to be aligned accordingly on compliant moorings, or be symmetrical, in order to capture the energy of the wave. The directions of waves near the shore can be largely determined in advance owing to the natural phenomena of refraction and reflection but the difficulty associated with accurately estimating and understanding wave patterns is not a small matter.

Additionally, the challenge of efficiently capturing the relatively irregular motion associated with waves has also had an impact on the design of the device. To operate efficiently, the device and corresponding systems have to be rated for the most common wave power levels. However, the device also has to withstand extreme wave conditions that occur very rarely, but could have power levels in excess of 2000 kW per frontal meter. Not only does this pose difficult structural engineering challenges, but it also presents one of the economic challenges as the normal output of the device (and associated revenue) are produced by the most commonly occurring waves, yet the capital cost of the device construction is driven by a need to withstand the high power level of the extreme, yet infrequent, waves. There are also additional design challenges that must be overcome in order to mitigate the highly corrosive environment of devices operating in or near seawater.

Finally, although many experimental and early stage wave energy extraction projects hold some promise, there yet remains a lack of convergence on the best method of extracting energy from the waves and, although previous innovation has generally focused on the concept and design of the primary interface, questions arise concerning how best to optimize the components of the systems, including the generation mechanism and the associated powertrain and energy transfer mechanisms. Accordingly, without additional developments and improvement in the practical application of floating bodies and PTO systems, the extraction of available energy from ocean waves will continue to be suboptimal.

SUMMARY OF THE INVENTION

The most preferred embodiments of the present invention comprise a one-degree-of freedom (1 DOF) ocean-wave energy capturing device with a wave-energy extraction efficiency demonstrated to be as high as 96%, with 12.5% of incident wave transmitted beyond the floating body, serving as a floating breakwater as well. Per existing inviscid-fluid theory, at the heave resonance frequency of the floating body, when the extraction damping of the PTO is matched with the radiation damping of the floating body, a 100% efficiency of energy capture and 0% of wave transmission is possible. The shape of the floating body is designed to mimic a floating body that demonstrates little viscosity effects.

The reduction of viscosity effects is important to achieve higher energy capture efficiency rates. As a result of this change, the hydrodynamics associated with the floating body (e.g., added mass and damping coefficients, resonance frequency, exciting forces, etc.) have been optimized as set forth herein. The preferred embodiments of the floating body disclosed herein can yield a theoretical efficiency of 96.34% and wave-transmission coefficient of only 12.5% (1.56% energy transmission on the leeward side), when operated at the design resonance frequency, if the extraction damping of the PTO and the hydrodynamic radiation damping of the system are matched. The most preferred embodiments of the present invention utilize a Permanent Magnet Linear Generator (PMLG) for the PTO and the PTO is coupled to the floating body. The damping for the PMLG was tuned to a value close to or substantially the same as the radiation damping of the floating body.

The most preferred embodiments of the energy-capturing floating breakwater of the present invention are readily adaptable for both stationary installations as well as attachment to floating/moored installations and applications. The floating body used in the energy-capturing floating breakwater of the present invention is useful to extract energy from waves while simultaneously serving as a breakwater if needed or desired. The breakwater function is largely incidental to the specific design of the asymmetrical floating body used.

Fabrication of a physical two-dimensional model of 0.228 m (B)×0.8 m (D)×2.33 m (W) size was made to fit at the Model Testing Facility of The University of California, Berkeley and the guided heaving motion may be coupled with the PMLG. The floating body then was tested both with and without a PMLG PTO system. Measurements showed that even when the PMLG operates at just 48% of the optimal damping, the device yields already an energy-capturing efficiency of 82%, with only 14% of the incident-wave amplitude transmitted. These measured data are in agreement with the theoretical predictions performed for this geometry and confirm the extremely favorable and desirable performance of this novel combination of the asymmetrical floating body, PMLG, and mounting structure. At least one preferred embodiment of the present invention may be referred to by the name "Berkeley Wedge."

BRIEF DESCRIPTION OF THE FIGURES

The preferred embodiments of the present invention will hereinafter be described in conjunction with the appended drawings, wherein like designations denote like elements.

DETAILED DESCRIPTION OF THE INVENTION

Figure 1:
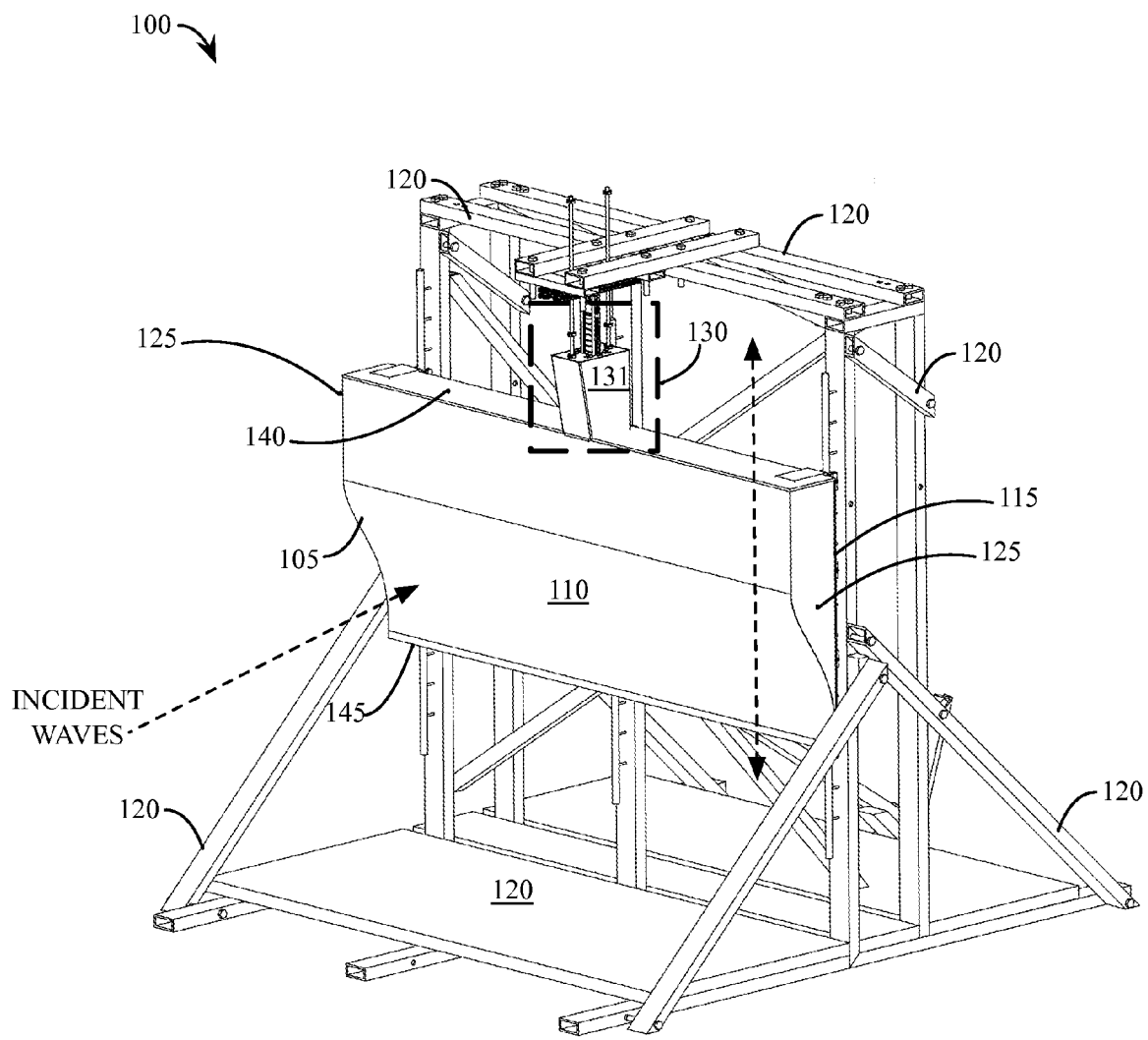
FIG. 1 is a perspective diagram of an energy-capturing floating breakwater in accordance with a preferred exemplary embodiment of the present invention.

The most preferred embodiments of the present invention comprise the combination of: an asymmetrical floating body designed in accordance with the parameters in Appendix 1; a specially designed guiding structure; and a PMLG-based PTO system. With the most preferred embodiments of the present invention, the damping of the PTO is matched with the radiation damping of the asymmetrical floating body, a shape-dependent hydrodynamic property. When operated at resonance in heave motion, the most preferred embodiments of the present invention are capable of capturing up to 96% of incident-wave energy while simultaneously acting as a breakwater or wave shield, since about only 12.5% of the wave amplitude (or only 1.56% of the energy flux) will be transmitted to the leeward side.

The most preferred embodiments of the present invention are configured to capture wave energy in a broad range of frequencies. Additionally, certain preferred embodiments of the present invention may be implemented near shore for protecting boats from ocean waves while simultaneously producing electricity for local communities. The present invention can also be attached to fixed or moveable offshore structures to act as a surface-wave shield, leaving a relatively calm region beyond the floating body, while simultaneously generating power. Additionally, the methods used to determine the optimal shape for a floating body disclosed herein may also be used to minimize the effect of viscosity on other objects in the presence of heaving forces (see Appendix 1, for the derivation of equation 15).

The most preferred embodiments of the present invention are configured and constrained to exhibit the simplicity of one degree of motion only (e.g., vertical or "heave" motion). With the use of an appropriate PMLG, it is relatively easy to match the required damping to enhance the probability that the waves will be generating electricity from the rectilinear motion associated with the heave motion generated by the impact of the waves on the floating body. The wave energy extraction systems provided by the various embodiments of the present invention are passive, requiring no artificial energy input and no gearing. The systems are environmentally friendly since aquatic species can swim under and around the floating body and associated support structure used to suspend the floating body in the ocean.

For certain applications, a preferred embodiment of the present invention may be installed near shore to act as a combination unit, serving as an efficient breakwater while generating electricity at the same time. While there are many prior art artificial breakwaters, very few are known to also serve as a WEC. For these applications, the floating body and the PTO may be mounted to a support structure with the support structure being secured to the seabed. Similarly, one or more preferred embodiments of the present invention may be deployed in conjunction with floating wind-energy platforms or the like. In this application, the floating body and associated structure serve as an energy-extraction device, mounted to the side of a wind-energy platform while simultaneously serving as a wave shield, thereby providing a relatively calm region for marine operations conducted behind the breakwater. At least one preferred embodiment of the present invention may be referred to by the name "Berkeley Wedge."

Referring now to FIG. 1, an energy-capturing floating breakwater 100 in accordance with a preferred exemplary embodiment of the present invention is depicted. As shown in FIG. 1, an asymmetrical floating body 110 is connected to a support structure 120. Asymmetrical floating body 110 comprises a curved surface 105 (a shape with a single inflection point), a substantially vertical flat back portion 115, a pair of side portions 125, a tip portion 145, and a top portion 140. The shape of asymmetrical floating body 110 is specifically designed to minimize viscous effects in order to maximize the heaving motion of asymmetrical floating body 110 resulting from incident-wave excitation. The formula for the derivation of the shape of asymmetrical floating body 110 is:

$$\mathscr{F}(\bar{y}) = 0.05926(\bar{y}+1)^2 + 3.88147(\bar{y}+1)^3 - 2.94074(\bar{y}+1)^4.$$

Those skilled in the art will recognize that equation 15 in Appendix 1 provides a guideline for deriving effective and efficient shapes for asymmetrical floating body 110 but minor variations (e.g., small adjustments to the constants) in equation 15 will yield similar results. In at least one preferred exemplary embodiment of the present invention, asymmetrical floating body 110 has dimensions of 1.1 m (depth)×0.227 m (beam)×2.3 m (wide) with a draft of 0.8 m. Curved surface 105 of asymmetrical floating body 110 is installed and positioned so as to be facing the incident waves. Back portion 115 of asymmetrical floating body 110 is very flat, thus, very small waves generated by asymmetrical floating body 110 may be observed as asymmetrical floating body 110 moves upward and downward in a substantially vertical orientation. The outer surface or plates of asymmetrical floating body 110 (e.g., curved surface 105, back portion 115, and top portion 140) can be fabricated from any suitably durable and strong material. (e.g., plastics, carbon, Kevlar®, composites, fiberglass, etc.).

Additionally, a permanent magnet linear generator (PMLG) 130 is also mounted to support structure 120 and is also connected to asymmetrical floating body 110. When asymmetrical floating body 110 is impacted by incident waves from the left side, asymmetrical floating body 110 undergoes resulting vertical or heaving motion. The vertical motion is translated to electrical energy by PMLG 130 and the electrical energy may be stored in one or more battery banks (not shown this FIG.) or transmitted via one or more electrical transmission lines (not shown this FIG.) for use in electrical applications. For some environments, it may be desirable to cover PMLG 130 with a cover 131 so as to protect PMLG 130 from the elements.

Figure 2:
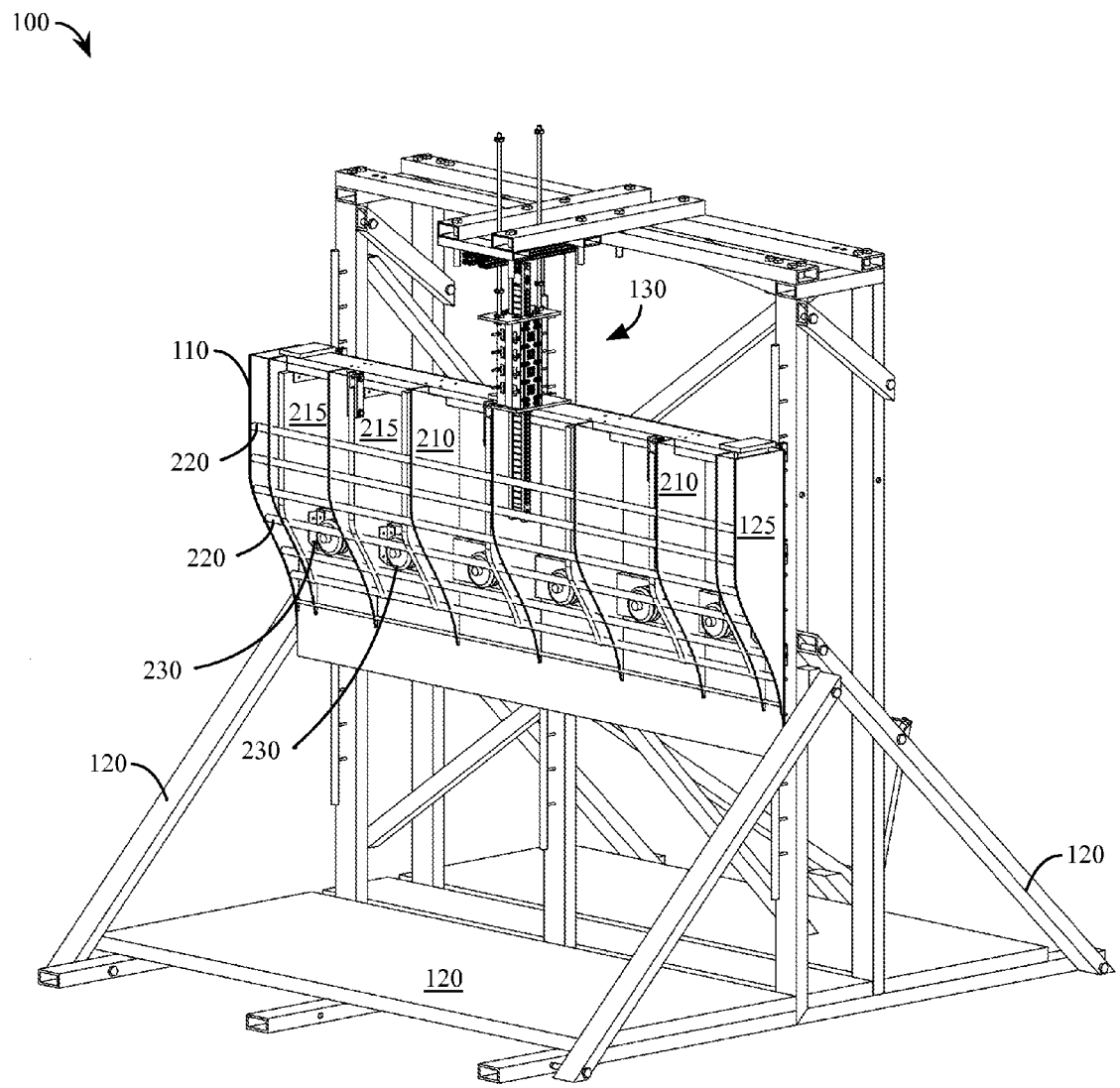
FIG. 2 is a perspective diagram of the energy-capturing floating breakwater of FIG. 1, showing additional detail.

In at least one preferred embodiment of the present invention, support structure 120 is designed to be mounted on the seabed for use in shallower water and weighed down with concrete ballast or the like in order to provide high stability when asymmetrical floating body 110 is in motion in response to one or more waves impacting curved surface 105. Support structure 120 comprises a plurality of structural framing and support elements manufactured from a plurality of rectangular tubes or brackets, as shown in FIG. 1 and FIG. 2. Those skilled in the art will recognize that support structure 120 is only one of many embodiments for a suitable support structure. The materials used to construct or manufacture support structure 120 will vary, depending on the installation application and environment. Any suitable material known to those skilled in the art (e.g., steel, composites, fiberglass, etc.) may be used to construct or manufacture support structure 120. Connecting elements such as bolts, welds, pins, and the like may also be employed where useful.

When the damping force of the generator is matched with the radiation damping of the floating body at the floating body's resonance frequency, maximum energy extraction efficiency is achieved. The resonance frequency of the floating body can be matched with the dominant frequency of the incident waves in a given shore location for maximum possible energy extraction. The radiation damping of the floating body can be varied through one of the following methods: 1) changing the draft of the floating body by adding or removing ballast positioned inside the floating body; 2) changing the beam to draft ratio of the floating body; 3) adding a spring to the generator. Any of these methods may be used alone or in combination and will result in an adjusted radiation damping. This specific asymmetric floating body design permits a very small fraction of incident waves to transmit beyond the floating body, resulting in a calm water region on the leeward side and almost all of the energy goes to the power take off (PTO).

In summary, the combination of the asymmetric floating body, LPMG, and a mounting structure is both a high-performance wave energy extraction device and acts like a breakwater (e.g., wave shield). In the most preferred embodiments, the length of asymmetrical floating body 110 (e.g., from side to side) is substantially greater than the width (e.g., from front to back) and height (e.g., from top to bottom) of asymmetrical floating body 110.

This system can be used for many different applications, such as implementations near shore to protect vessels from ocean waves while simultaneously producing electricity for local communities. It can also be attached to offshore structures to produce power and act as a surface-wave shield. Additionally, the floating body shape on its own can be applied to other types of floating bodies to reduce the effect of flow separation because of fluid viscosity.

Referring now to FIG. 2, one example of the kinds of structural elements associated with asymmetrical floating body 110 are depicted. As shown in FIG. 2, the internal structure of asymmetrical floating body 110 may comprise one or more types of internal web members 210 and 215, one or more stiffening rods 220, and one or more internal ballasts 230. Shape supporting web members 210 are installed inside asymmetrical floating body 110 to stiffen and provide additional support for the front of the floating body and back plates. Structure supporting web members 215 are used to reinforce the overall structure of asymmetrical floating body. Stiffening rods 220 provide further structural strength for curved surface 105 to resist buckling when asymmetrical floating body 110 is under hydrostatic and hydrodynamic (e.g., motion-induced) loads. Stiffening rods 220 may be manufactured from fiberglass, steel, or other suitable material.

If a less robust material is used for fabricating the outer surfaces of asymmetrical floating body 110, additional of internal web members 210 and 215 may be used to provide additional strength to the overall structure. There will always be a tradeoff between strength, weight and cost of materials so the number and type of internal structure elements may vary, depending on the specific application. Internal ballasts 230 are generally positioned near the lower tip of asymmetrical floating body 110 to lower the center of gravity and increase the overall stability of asymmetrical floating body 110 when asymmetrical floating body 110 is impacted by waves.

Figure 3:
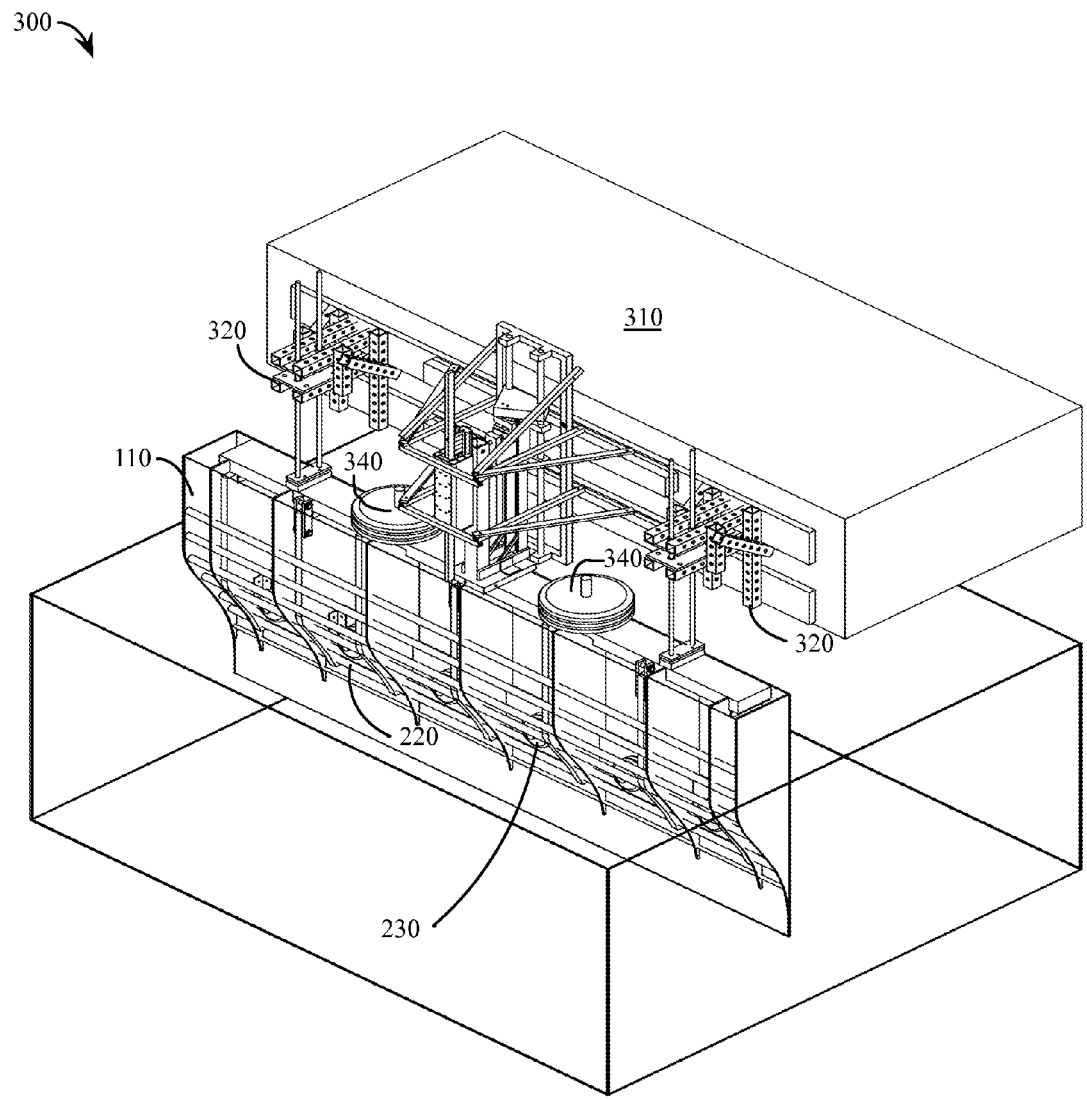
FIG. 3 is a perspective diagram of an energy-capturing floating breakwater in accordance with an alternative preferred exemplary embodiment of the present invention.

Referring now to FIG. 3, an energy-capturing floating breakwater 100 in accordance with an alternative preferred exemplary embodiment of the present invention is depicted. As shown in FIG. 3, asymmetrical floating body 110 is now supported by top-mounted structural elements 320, which are used to attach when asymmetrical floating body 110 to fixed mount 310. The configuration shown in FIG. 3 depicts a configuration suitable for testing in a wave tank or similar situations. This typical configuration consists of asymmetrical floating body 110, PMLG 130, top mounted support structure, and a stationary carriage. Additional ballast 340 and internal ballast 230 may be used to adjust the draft of asymmetrical floating body 110 as well. Those skilled in the art will readily recognize that the structural arrangement shown in FIG. 3 could be easily adapted so as to deploy one or more asymmetrical floating bodies 110 in deeper water, in conjunction with a floating platform or other moored structure. In this fashion, an asymmetrical floating body 110 may be used in applications other than shoreline applications.

Figure 4:
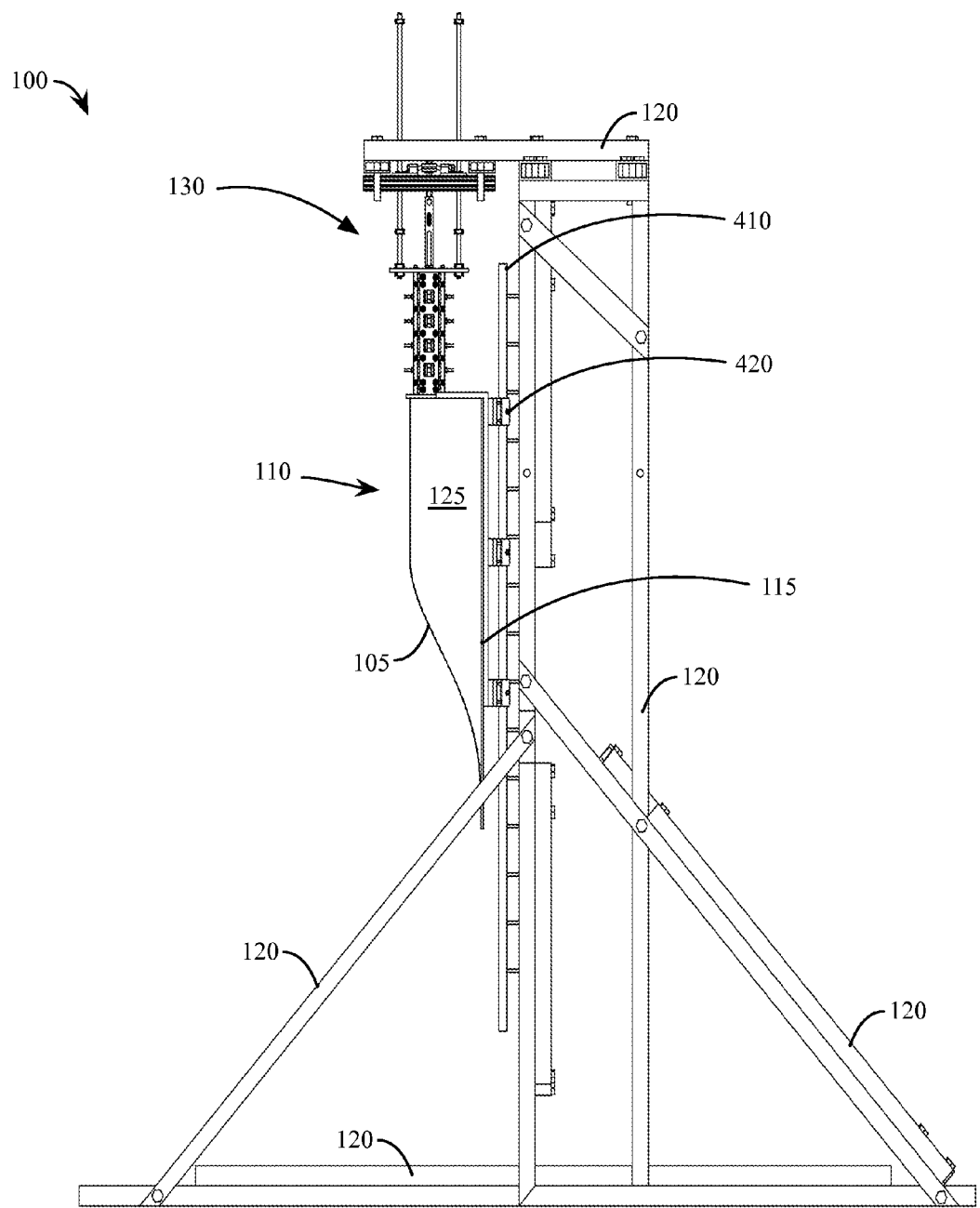
FIG. 4 is a side view of the energy-capturing floating breakwater of FIG. 1.

Referring now to FIG. 1 and FIG. 4, a side view of asymmetrical floating body 110 of FIG. 1 is depicted. As shown in FIG. 4, heave-motion guiding rods 410 (e.g., heave rods) and a plurality of linear ball bearing systems 420 are employed to connect asymmetrical floating body 110 to support structure 120. Heave motion guiding rods 410 serve to constrain the motion of asymmetrical floating body 110 to vertical movement only, thereby enhancing the transfer of energy from the waves to PMLG 130.

Figure 5:
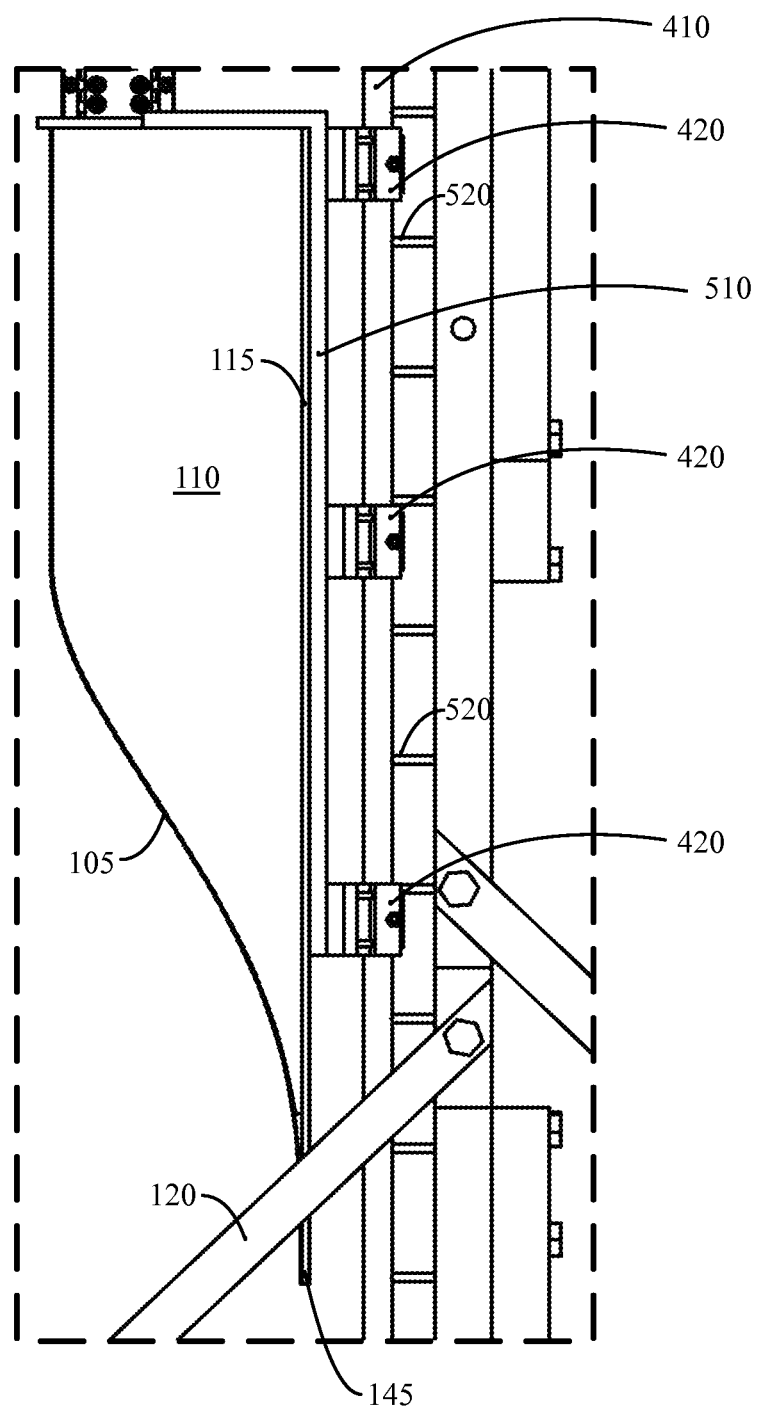
FIG. 5 is a close-up view of a preferred attachment mechanism for an asymmetrical floating body used in conjunction with the energy-capturing floating breakwater of FIG. 1.

Referring now to FIG. 1 and FIG. 5, an attachment mechanism for connecting asymmetrical floating body 100 to support structure 120 is depicted. As shown in FIG. 5, a bracket 510 is connected to back portion 115 with screws or welds, which will depend on the material selection for fabricating asymmetrical floating body 110. Open pillow-block linear ball bearings 420 are connected to bracket 510 in order to restrict asymmetrical floating body 110 to the heaving motion only with minimal friction. Heave rods 410 are connected to support structure 120 via connections 520 and slide inside linear ball bearings 420. As previously mentioned, depending on the installation environment, the materials used for support structure 120 may need to be corrosion resistant with high strength to withstand wave loads and the corrosive ocean environment. Those skilled in the art will recognize that various types of watertight linear ball bearings can be implemented instead pillow-block linear ball bearings 420 to provide extra protection against corrosion. Further, alternative attachment mechanisms may be selected so as to further reduce friction and to withstand the tension and compression forces resulting from wave forces and the motion of asymmetrical floating body 110.

Figure 6:
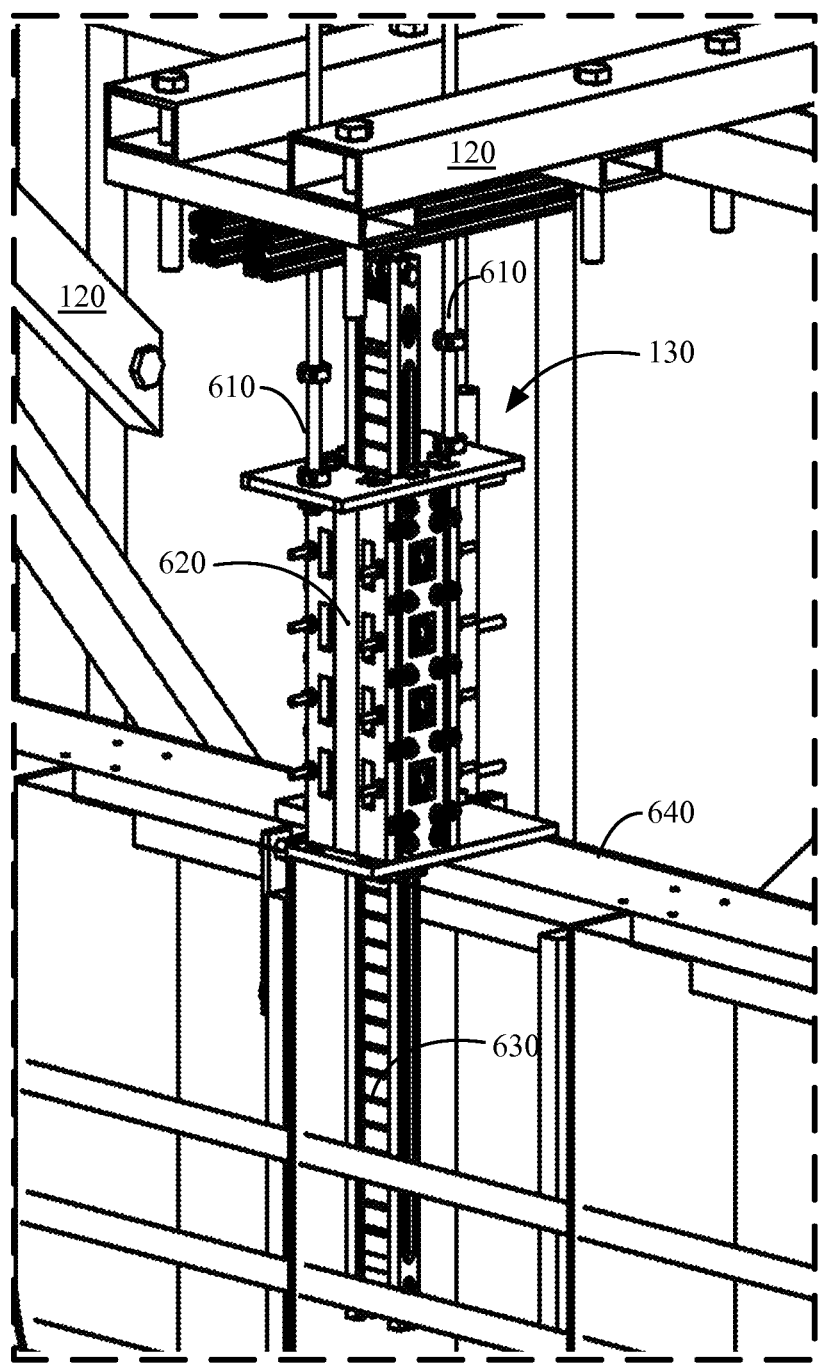
FIG. 6 is a an energy-capturing floating breakwater in accordance with a preferred exemplary embodiment of the present invention.

Referring now to FIG. 6, a suitable location for PMLG 130 is depicted. As shown in FIG. 6, PMLG 130 is most preferable positioned between asymmetrical floating body 110 and support structure 120. The generator is positioned on top of the floating body away from the water surface in order to protect it from water intrusion. This figure shows the rotor and stator (internal components of PMLG). The PMLG can be custom designed or ordered separately. The excursion length and impedance properties of the PMLG are important for high efficiency.

In the most preferred embodiments of the present invention, PMLG 130 will comprise a stator 620 that has at least two columns of metallic teeth with coils winding around of the columns and at least two sets of ball bearings to guide rotor 630 in between the coils as moves up and down in response to the motion of the waves. Generator heave rods 610 provide additional stability for PMLG 310 when asymmetrical floating body 110 undergoes heave motion and experiences structural vibration. The damping force of PMLG 130 can be modified by changing the gap distance between the coils and stator and/or by changing the resistance of the coils' circuits. In the most preferred embodiments of the present invention, a combination of changing the gap distance and/or opening and shorting the coils, may be used to control and adjust the damping of PMLG 130. PMLG 130 may be mounted on the top of asymmetrical floating body 110 as shown in FIG. 1. However, those skilled in the art will recognize that PMLG 130 may be positioned in other locations as well. For example, PMLG 130 may be contained within asymmetrical floating body 110 with the rotor attached to the support structure via a heave rod system. Additional guidance on PMLG design is set forth in Appendix 1.

Figure 7:
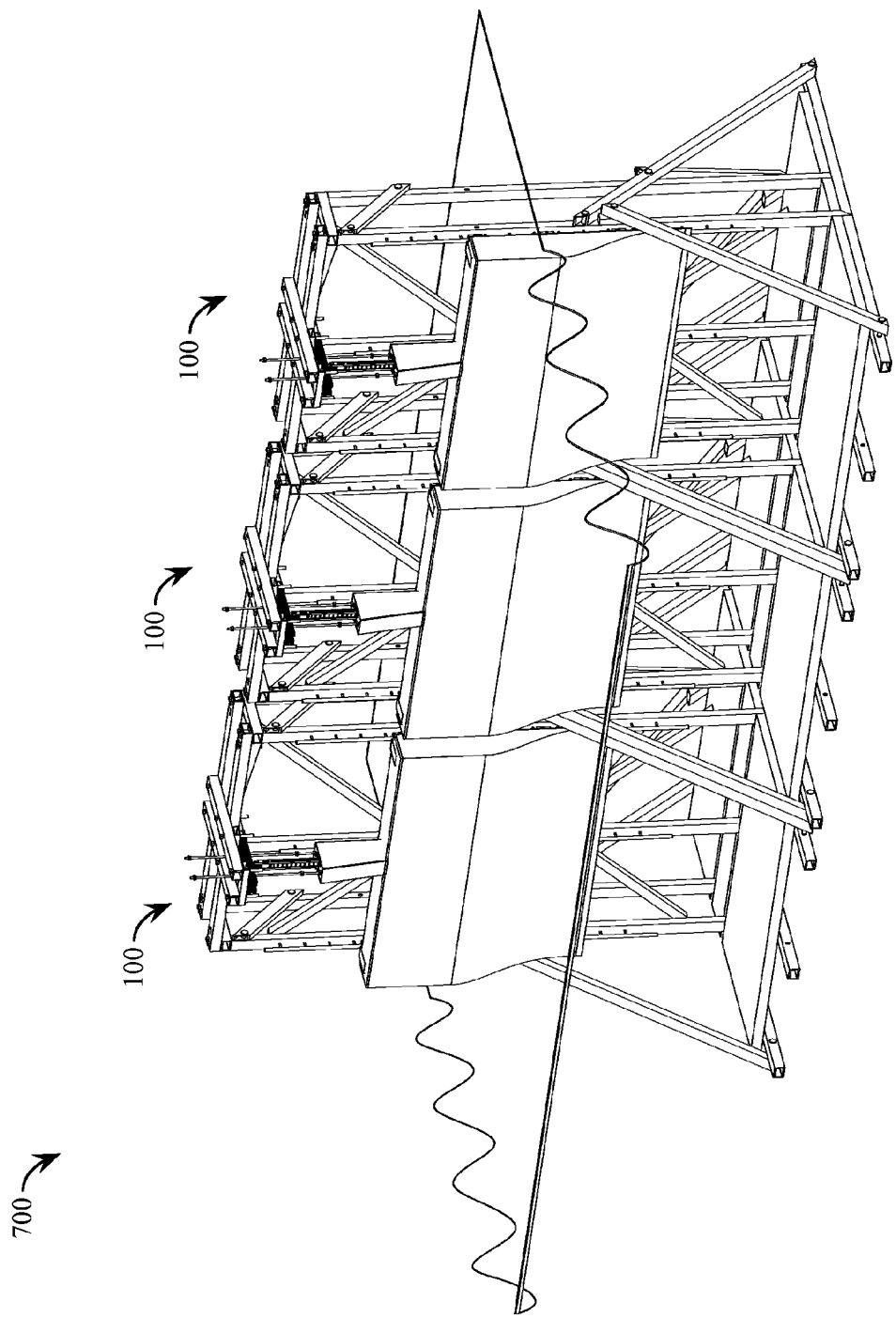
FIG. 7 is a perspective view of a plurality of energy-capturing floating breakwaters coupled together in accordance with a preferred exemplary embodiment of the present invention.

Referring now to FIG. 7, a perspective view of a plurality of energy-capturing floating breakwaters 100 coupled together to form an expanded energy capture system 700 in accordance with a preferred exemplary embodiment of the present invention are depicted. As configured in FIG. 7, energy capture system 700 provides greater lateral presentation to the wave system, thereby providing a wider front for increased energy production and protection from ocean waves. In this fashion, larger amounts of energy may be captured and larger breakwater areas may be established. Additionally, the arrangement or positioning of the plurality of energy-capturing floating breakwaters 100 may be varied depending on the application environment (e.g., bottom geometry, wave direction, etc.). The plurality of energy-capturing floating breakwaters 100 may be arranged in a straight line as shown in FIG. 7 or, alternatively, in a more concave or convex arrangement, as necessary or desired to achieve optimal performance.

Depending on the specific location and application, any number of energy-capturing floating breakwaters 100 may be coupled together. Additionally, in at least some preferred embodiments of the present invention, one or more floating platforms configured with an energy-capturing floating breakwater 100 facing in different directions may also be included in energy capture system 700. This provides for significant flexibility in the design and deployment of an energy capture system 700, thereby allowing each system 700 to be adapted for the specific practical realities of the installation location.

As disclosed herein, the most preferred embodiments of the present invention provide a generic design that can be tuned to work in optimal conditions at specific locations, depending on the specific environmental conditions. For the implementation of the design at a given site, the installation design can be adapted by varying the beam to draft ratio of the floating body, changing the draft of the floating body, or adding a mechanical spring to the PTO to match the resonance heave frequency of the system to the dominant frequency of the incident waves. The resonance frequency of asymmetrical floating body 110 depends on the hydrodynamic properties of asymmetrical floating body 110, when inertial forces cancel the spring or hydrostatic restoring forces (see Appendix 1, equation 18).

The most preferred embodiments of the present invention comprise an asymmetrical, highly efficient 1-DOF (heave motion) WEC, which can serve as an almost perfect breakwater. Symmetric heaving devices are known to yield only 50% energy-capturing efficiency. The floating body shape of the present invention is designed to have minimal influence from viscosity and is most preferably configured to operate in conjunction with a permanent magnet linear generator (PMLG) as a PTO. The present invention does not require any gear reduction (as opposed to prior art rolling type designs) and is a passive system without the need of a controller or any sophisticated electronics. In all, the proposed 1-DOF system of the present invention provides high hydrodynamic performance, energy extraction for onshore or offshore use, and wave protection as a breakwater or shield for constructions or installation in offshore activities.

As is known to those skilled in the art, existing symmetric wave energy devices are understood to have a maximum wave energy extraction efficiency of approximately 50%. The design of the floating body of the present invention is highly asymmetrical with very minimal influence by viscosity due to the nature of the design (see Appendix 1, equation 15).

In order to convert the motion of the floating body to useful electrical energy, a PTO that acts as a linear spring-damper system may be attached to the floating body. The floating body, when in motion excited by wave movement and impact, is subjected to a force from the PTO and, accordingly, when the floating body is at resonance and the PTO damping is equal to the radiation damping of the floating body, the maximum energy extraction efficiency will be obtained. The damping required for resonance can be adjusted to achieve the optimal energy-extraction efficiency for all frequencies and far-field wave amplitudes. This can be achieved by varying the electrical resistance of PMLG 130 of FIG. 1.

For testing purposes, the draft of 0.8 m in neutral equilibrium for the floating body of FIG. 3 was fabricated to match the resonance period of the floating body to the linear wave making range of the wave maker. The materials used in the fabrication of the floating body were wood, polycarbonate, Plexiglas®, fiberglass, and aluminum. The floating body's internal structure was made of nine Plexiglas® webs, each having the exact shape of the floating body of FIG. 3. Ballast may be positioned near the tip of the floating body in order to achieve the desired draft and the steps to calculate the optimal draft are shown in Appendix 1. Finally, the curved side of the floating body was covered with a 0.00635 m thick polycarbonate plate. At installation, the system may be tested for free decay with and without PTO load in order to obtain experimental hydrodynamic properties for a floating body.

Prior to the installation of PMLG 130 of FIG. 6, its electrical damping can be obtained by a bench test or by tuning the electrical circuitry of the generator. Resonance frequency is the frequency at which the floating body undergoes a maximum heave motion and the higher the resonance frequency, the more efficient the PTO will be.

From the discussion herein it will be appreciated that the most preferred embodiments of the present invention comprise a highly efficient wave-energy extraction device that may also serve as a protecting breakwater near shore or as a wave shield for construction or installation of offshore activities. The various embodiments may be mounted on an existing offshore platform to provide a calm region for receiving supply boats or similar marine operations. Since the PTO associated with the invention is positioned above the surface of the water, it is relatively simple to implement and maintain. In its design condition, the invention generates electricity efficiently, leaving little energy to be transmitted in the leeward side or contained in the reflected waves in the waveward side. The most preferred embodiments of the present invention comprise a passive but high-efficiency system requiring no active control or man-made energy input. The invention may also serve as a simultaneous energy-capture and wave shield device that is environmental friendly.

From the discussion herein it will be appreciated that the invention can be embodied in various ways, including but not limited to the following:

A floating breakwater apparatus for capturing energy from wave motion, the apparatus comprising: (a) a generally flat back plate; and (b) a plurality of spaced-apart wedges, each said wedge having a generally flat side coupled to the back plate and a curved side extending outward from the back plate to form a curved section with an inflection point configured for facing incident waves. The equation for obtaining the distinctive shape is shown in Appendix 1, equation 15.

A floating breakwater apparatus for capturing energy from wave motion, the apparatus comprising: (a) a generally flat back plate; (b) a plurality of spaced-apart wedges, each said wedge having a generally flat side coupled to the back plate and a curved side extending outward from the back plate to form a curved section with an inflection point configured for facing incident waves; and (c) a lower ballast positioned as close to the tip of the floating body as possible to achieve lower center of gravity, providing more stability to the overall floating body.

Although the description herein contains many details, these should not be construed as limiting the scope of the invention but as merely providing illustrations of some of the presently preferred embodiments of this invention. Therefore, it will be appreciated that the scope of the present invention fully encompasses other embodiments that may become obvious to those skilled in the art. Accordingly, in addition to any other claims, the inventors claim each and every embodiment of the invention described herein, as well as any aspect, component, or element of any embodiment described herein, and any combination of aspects, components or elements of any embodiment described herein.

The invention claimed is:

1. An energy-capturing floating breakwater comprising:
   a support structure;
   a permanent magnetic linear generator connected to the support structure; and
   an asymmetrical floating body connected to the permanent magnetic linear generator and the support structure wherein the asymmetrical floating body is constrained to movement in a substantially vertical direction and wherein the asymmetrical floating body comprises a tip portion.

2. The energy-capturing floating breakwater of claim 1 wherein the shape of the asymmetrical floating body is derived using the formula $$\mathscr{F}(\bar{y}) = 0.05926(\bar{y}+1)^2 + 3.88147(\bar{y}+1)^3 - 2.94074(\bar{y}+1)^4.$$

3. The energy-capturing floating breakwater of claim 1 further comprising internal ballast positioned as close to the tip of the asymmetrical floating body as possible to achieve a lower center of gravity, thereby providing stability to the asymmetrical floating body.

4. The energy-capturing floating breakwater of claim 1 wherein a damping for the permanent magnetic linear generator is substantially the same as a radiation damping associated with the asymmetrical floating body.

5. The energy-capturing floating breakwater of claim 1 wherein the asymmetrical floating body comprises:
   a substantially flat back portion;
   a curved surface, the curved surface extending outward from the back plate to form a curved section with an inflection point configured for facing incident waves;
   a pair of side portions; and
   a top portion, the top portion being attached to the permanent magnetic linear generator.

6. The energy-capturing floating breakwater of claim 1 further comprising;
   a rotor;
   a stator, the stator comprising at least two columns of metallic teeth with coils winding around the columns; and
   at least two sets of ball bearings to guide the rotor in between the coils as the energy-capturing floating breakwater moves up and down in response to a motion generate by one or more waves.

7. The energy-capturing floating breakwater of claim 1 wherein the asymmetrical floating body comprises:
   a plurality of shape supporting web members;
   a plurality of structure supporting web members; and
   a plurality of stiffening rods.

8. The energy-capturing floating breakwater of claim 1 wherein the asymmetrical floating body comprises:
   a substantially flat back portion;
   a curved surface, the curved surface extending outward from the back plate to form a curved section with an inflection point configured for facing incident waves;
   a pair of side portions;
   a top portion, the top portion being attached to the permanent magnetic linear generator;

a plurality of shape supporting web members;
a plurality of structure supporting web members; and
a plurality of stiffening rods.

9. The energy-capturing floating breakwater of claim 1 further comprising:
a plurality of heave-motion guiding rods connected to the support structure; and
a plurality of linear ball bearing systems.

10. The energy-capturing floating breakwater of claim 1 further comprising at least one floating wind-energy platform attached to the energy-capturing floating breakwater.

11. A method comprising the steps of:
placing an energy-capturing floating breakwater in a body of water, the energy-capturing floating breakwater comprising:
a support structure;
a permanent magnetic linear generator connected to the support structure; and
an asymmetrical floating body connected to the permanent magnetic linear generator and the support structure wherein the asymmetrical floating body is constrained to movement in a substantially vertical direction and wherein the asymmetrical floating body comprises a tip portion; and
positioning the energy-capturing floating breakwater so that a curved surface of the asymmetrical floating body intercepts incident waves.

12. The method of claim 11 further comprising the step of deriving the curved surface for the asymmetrical floating body using the equation $$\mathscr{F}(\bar{y}) = 0.05926(\bar{y}+1)^2 + 3.88147(\bar{y}+1)^3 - 2.94074(\bar{y}+1)^4.$$

13. The method of claim 11 further comprising at least one of the steps of:
storing the electrical energy generated by the breakwater; and
transmitting the electrical energy generated by the breakwater to a point of use.

14. The method of claim 11 further comprising the step of varying the radiation damping of the asymmetrical floating body by at taking at least one of the steps comprising:
changing the draft of the asymmetrical floating body by adding or removing ballast positioned inside the asymmetrical floating body;
changing the beam to draft ratio of the asymmetrical floating body; and
adding a spring to the permanent magnetic linear generator.

15. The method of claim 11 further comprising the step of adjusting the draft of asymmetrical floating body by adding ballast to the asymmetrical floating body.

16. The method of claim 11 further comprising the step of adjusting a damping for the permanent magnetic linear generator so as to be substantially the same as a radiation damping associated with the asymmetrical floating body.

17. The method of claim 11 further comprising the steps of:
positioning the energy-capturing floating breakwater so as to provide a breakwater for one or more marine operations; and
simultaneously converting wave motion into electrical energy.

18. The method of claim 11 further comprising the step of constraining the movement of the asymmetrical floating body to a vertical direction by using a plurality of heave-motion guiding rods and a plurality of linear ball bearing systems.

19. The method of claim 11 further comprising the step of adjusting the damping for the permanent magnetic linear generator by at least one of:
changing the gap distance between a stator and a rotor; and
opening and shorting at least one coil for the permanent magnetic linear generator.

20. The method of claim 11 further comprising the steps of:
positioning a plurality of energy-capturing floating breakwater so as to provide a breakwater for one or more marine operations; and
simultaneously converting wave motion into electrical energy.

* * * * *